June 9, 1942.   J. N. SHARMA   2,286,164
ART OF COLORING FRUIT
Filed Feb. 24, 1934

Inventor
Jagan N. Sharma
By Lyon & Lyon
Attorneys

Patented June 9, 1942

2,286,164

UNITED STATES PATENT OFFICE 2,286,164

ART OF COLORING FRUIT

Jagan N. Sharma, Berkeley, Calif., assignor to Food Machinery Corporation, San Jose, Calif., a corporation of Delaware Application February 24, 1934, Serial No. 712,831

8 Claims. (Cl. 99—103)

This invention relates to the art of imparting a substantially permanent, desired coloring to fruit which are provided with water-repellent oily or waxy surfaces. Although the subject matter of this invention is capable of use on various fruits provided with water-repellent surfaces, such as apples and citrus fruit, it will be described in considerable detail, for purposes of illustration, in its application to the art of treating citrus fruit.

It is well known that citrus fruit vary in color and that variation in color or shade from the standard varietal color does not necessarily mean that the fruit is immature or of low quality. Often the color of the fruit varies with the character of the soil, intensiveness of cultivation and fertilization, purely climatic conditions such as intensity of sunlight during various stages of the fruit's growth, the presence of rain during other periods, etc. Fruit which are "off" color may be just as satisfactory from the standpoint of flavor, juice content, sugar content, etc., as other fruit of the same variety but of a more fully developed and truly characteristic color. The growers, however, have not been able to obtain as great a remuneration for off color fruit as for fruit in which the color has been more definitely and attractively developed, this condition being primarily due to the sales appeal or attractiveness of the more vividly colored fruit.

It has been suggested that fruit be treated with oleaginous emulsions containing a dye but numerous problems arise in the commercial utilization of this suggestion. The use of oleaginous solvents as the carrier or liquid vehicle for the dye has certain objectionable aspects. When oils having relatively high boiling points and viscosity are employed, the time of contact between the fruit and the dye-containing oil needs be unduly long and often the color may not be fully developed for several hours after such contacting has been terminated. This disturbs the operating schedule of the packing house by necessitating greater storage facilities and extending the period of time during which fruit is kept by the packer. When oleaginous solvents having a low boiling point and viscosity, such as kerosene or gasoline, are used, the natural oils and waxes present in the skin of the fruit are leached out to some extent and the fruit has a tendency to wither and shrink quickly. These objectionable features are obviated by the present invention which contemplates the use of aqueous media for a suitable oil-soluble dye.

It is also necessary that the dye used be of a character substantially unaffected by alkalies or acids. It is customary practice to wash or cleanse citrus fruit and alkalies or alkali-containing substances are generally used in the washing solution. The dye must be of such character that upon being applied to the skin of the fruit, it should not change in color or shade because of traces of alkali carried by such skin from a prior washing or cleansing. Furthermore, in the event the dye penetrates into the skin of the fruit, it should not change in shade or color by reason of the organic acids naturally occurring in such skin. Moreover, in order to be commercially satisfactory, the dye should be substantially sun-fast so that the treated fruit, upon exposure to sunlight by the vendor or purchaser, will not bleach. Again, the dye used should be edible and not toxic in the quantities in which it is introduced into the skin of the fruit.

This invention discloses and teaches the art suitable types of dyes for use in coloring fruits, such as citrus fruits having water-repellent or oily surfaces.

This invention also discloses a method whereby a very brief treatment may be satisfactorily and commercially employed. It has been discovered that aqueous media having a reduced surface tension, more specifically set forth hereinafter, are capable of applying a dye to materials of the character stated. In this manner, suitable colloidal suspensions of oil-soluble dyes may be made in aqueous media, thereby obviating the necessity of forming emulsions or using solvents such as kerosene or gasoline.

From the above, it will be apparent that an object of this invention is to disclose and provide novel dyeing and treating solutions, suspensions and media.

Another object is to disclose and provide an improved method of imparting a desired coloration to substances having water-repellent surfaces. More particularly, it is an object of this invention to disclose and provide a process of imparting a desired coloration to citrus fruit, such coloration being an integral, non-removable part of the skin of the fruit.

In describing a preferred embodiment of the invention, reference will be had to the appended drawing, in which.

Figure 1:
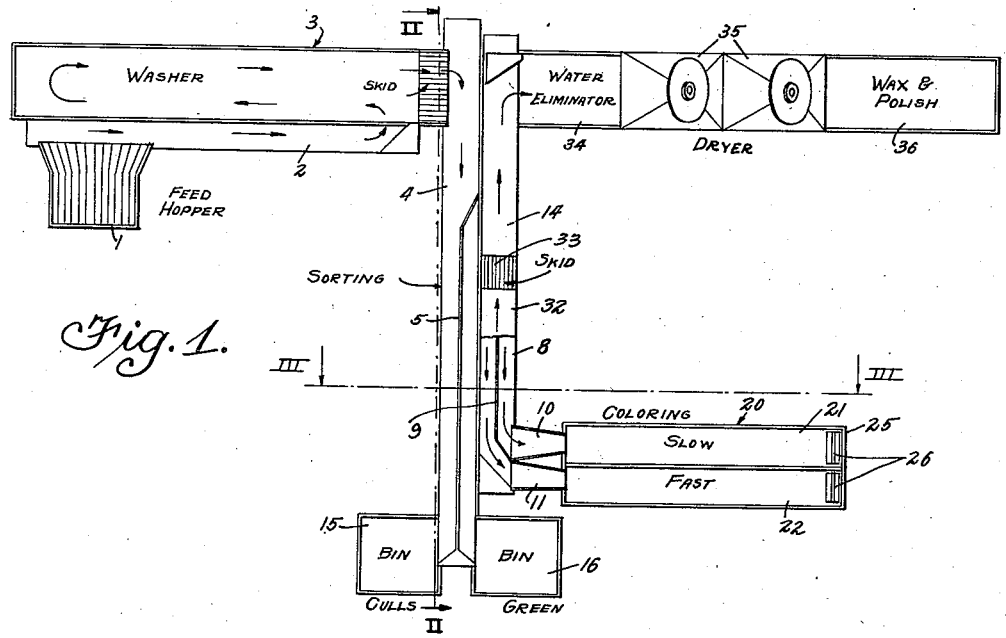
Fig. 1 is a diagrammatic plan view of an arrangement of elements adapted for the efficient washing, coloring and conditioning of citrus fruit.
Figure 2:
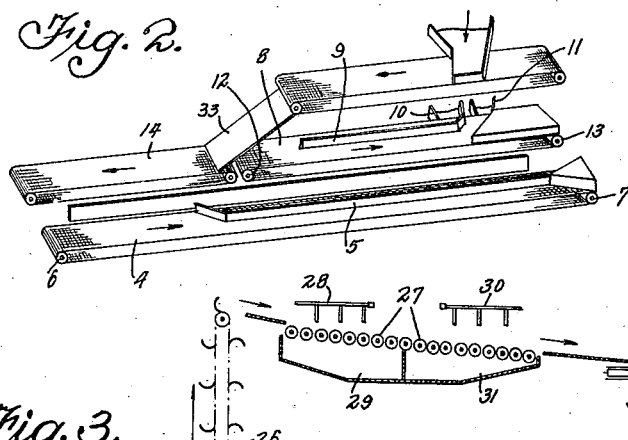
Fig. 2 is a diagrammatic side elevation, partly in section, taken along the plane II—II of Fig. 1.
Figure 3:
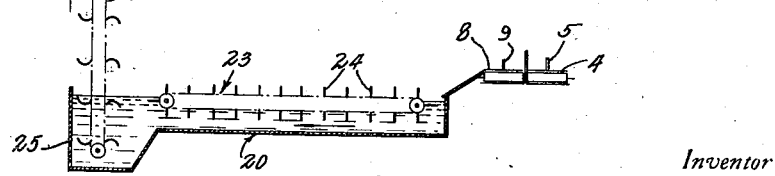
Fig. 3 is a side elevation, partly in section, taken along the plane III—III of Fig. 1.

In order to facilitate understanding of the invention, the materials, media, proportions, conditions of treatment, and apparatus in which the treatment may be carried out, relating to the adaptation of the invention to the citrus industry, will be described in considerable detail.

It is well known that the skin of citrus fruit contains oily and waxy constituents which render the skin water-repellent. Experience has shown that oil-soluble dyes are apparently the only dyes capable of imparting a desired coloration to the skin of a citrus fruit. Experience has also shown that the use of such oil-soluble dyes in oleaginous solvents, such as kerosene or gasoline, is unsatisfactory in that it facilitates and accelerates the shrinkage and burning of the fruit.

One of the discoveries embraced by this invention is that a suitable finely divided, organic, oil-soluble dye may be placed into colloidal solution and/or suspension in an aqueous medium which, upon being brought into contact with a citrus fruit, will impregnate the skin of the fruit with the dye. The dye then becomes a practically irremovable part of the skin. It is known that the dye will not be removed from the surface by ordinary rubbing, handling or washing. The dyed fruit does not lose its characteristic surface texture and the dye appears to impregnate at least the outer increment of the skin. In the prior processes, the dye is carried into the peel or skin by a solvent for the dye and waxy constituents of the peel, whereas according to the present invention the dye is applied in the form of a suspension in an aqueous medium. In practicing the present invention, an operative quantity of such a suspension must be employed, preferably in the absence of any such solvent, but if any quantity of such solvent be mixed with the suspension, the coloring of the fruit due to the presence of such solvent, if any, is no part of the present invention.

In order to facilitate the transfer of dye from the aqueous medium to the skin of the fruit, it has been found desirable to use surface tension reducing agents in solution in the aqueous medium. Various solids and liquids, such as saponin, and water-soluble soaps of oleic, stearic, palmitic, linoleic and other fatty or petroleum acids, and other water-soluble surface tension reducing agents may be used for this purpose, either singly or in combination. Sodium and potassium oleates, ammonium linoleate and sodium laureate are illustrative soaps suitable for this purpose. The surface tension of the aqueous medium should be reduced to less than about 36 dynes per centimeter in order to cause the dye carried by the aqueous medium to be imparted to the fruit with commercially successful rapidity.

Attention is called to the fact that in the event no blending agent is used, the dye should be very finely ground prior or during its incorporation in the aqueous, low surface tension medium. In the event a miscible blending agent is used, it may be that some of the dye will precipitate out of solution upon addition of the blending agent and dye contained therein to the aqueous medium. The precipitated portion of the dye should preferably be removed from the medium before using the same in a dyeing or coloring process. The various solids and liquids, such as water-soluble soaps and blending agents, referred to herein, are materials which, when dissolved in water, form, with the water, a solvent for dyes of the water-insoluble, oil-soluble class. These various solids and liquids, therefore, may be termed "aquasolufacients".

Various organic, substantially water-insoluble and oil-soluble dyes may be used. Inasmuch as the aqueous medium ordinarily contains a soap and such soap solution may have a pH either above or below 7, the organic dye should be of such character that it will not become colorless or change in color upon incorporation in the aqueous medium. It has been found that methylated aniline dyes, such as xylidine-diazo compounds, are particularly suitable for use in media for the treatment of citrus fruit. A dye constituted of methylated aniline plus azo-beta-naphthol imparts a desirable orange color. A dye constituted of aniline plus beta-naphtholamine, or one composed of ortho-toluidine plus beta-naphtholamine is also satisfactory, although the latter are not as fast to sunlight.

A suitable color-imparting colloidal solution and suspension may be prepared by dissolving about 0.1% of sodium oelate in water. This will result in a solution having a surface tension of about 24 dynes per centimeter at a temperature of 50° C. Smaller quantities of sodium oleate are also satisfactory. When 0.03% by weight of sodium oleate is used, the resulting solution will have a surface tension of about 32 dynes per centimeter at a temperature of 50° C. From about 0.01% to 1.0% by weight of a finely divided suitable organic dye, such as a methylated aniline dye, may then be incorporated in this solution. Preferably, the dye is incorporated with a portion of the solution as by trituration, and then added to the remainder of the soap solution. The resulting suspensions are relatively stable and are hereinafter referred to as "colloidal suspensions."

Attention is called to the fact that the incorporation of the dye in the aqueous medium has a tendency to slightly reduce the surface tension of the medium.

The citrus fruit which it is desired to color may then be brought into contact with the color-imparting medium. Preferably, the fruit are washed before such contact. It is not necessary that the fruit be dried or rinsed before the color-imparting treatment. The contacting operation is preferably carried out while the color-imparting medium is at a temperature of 40° C. to 50° C. Temperatures in excess of 50° C. are not recommended unless the time of contact is extremely short. At temperatures of 40° C. to 50° C. the time of contact may vary from 1 minute to about 5 minutes.

The proportion of dye carried by the treating medium, the temperature of such medium, and the time of contact, determine the intensity of the color developed upon the fruit. The surface tension of the medium also influences the ability of the dye to be transferred from the medium to the fruit.

As stated hereinabove, the surface tension should be about 36 dynes per centimeter before a uniform coloration of the desired tone is imparted to fruit by reason of contact not exceeding about 5 minutes in length. The change in color is apparent at the completion of the contacting operation.

After the fruit have been contacted with the treating medium, they may be rinsed and/or washed to remove any adhering solution and then dried, waxed and polished in any suitable manner. Prior to drying, it may be desirable to reduce the quantity of free water adhering to the fruit as, for example, by passing the fruit over rotating metallic rolls, each of the rolls being provided with a rubber scraper or squeegee.

The contact of citrus fruit with the coloring solution has a tendency to impart an orange or reddish tint to the stem or stem end of citrus fruit. This coloration does not ordinarily occur in nature. It has been found possible to selectively dye the stem or stem end of citrus fruit by using an aqueous solution of green dye, for example, after the fruit have been contacted with the yellow, orange or red dye-containing treating medium, and rinsed with clean water to remove any adhering coloring solution.

The fruit may then be sprayed with or dipped in an aqueous solution containing an oil or water-soluble green dye. Certified dyes which may be used for this purpose are Guinea Green and F. C. F. Green. Such green dye solution will impart a green coloration to the stem or button without dyeing the remaining surface portions of the citrus fruit. If the fruit is bruised, there is a tendency for the bruised portions of the skin to retain some of the green coloring but when the fruit is contacted with the green solution for only a very brief period of time, then the stem or button will be selectively colored, the bruised sections of the skin being unaffected by the green dye. Water solutions of these green dyes are preferably used; when a suspension of an oil-soluble green dye is used, the time of contact is brief, a selective dyeing action then taking place.

The process described hereinabove may be carried out in various forms of apparatus. The drawing appended hereto diagrammatically illustrates a form of apparatus which has been found to give extremely satisfactory results in the treatment of citrus fruit. As shown therein, the fruit may be fed to a hopper 1 from which they may be regulatably discharged onto a feeding belt 2. This belt discharges the fruit into the lower section of a washing and treating tank, generally indicated by the numeral 3. The fruit move longitudinally through the detergent or cleansing solution contained in the washing tank and are removed from the tank by means of an elevator which then places them on a series of brushing and scrubbing rolls. During such scrubbing or brushing, the fruit may be rinsed with water or with an aqueous solution containing a mold-inhibiting or retarding agent. This treating or rinsing solution may be separately caught and recirculated.

The fruit discharged from the washer 3 are placed upon a sorting conveyor 4 provided with an intermediate stationary partition 5 extending for the greater portion of the length of the conveyor 4. This sorting conveyor 4 may be mounted on pulleys 6 and 7, intermediate supporting rollers not being shown. Adjacent said sorting conveyor 4 and at substantially the same level is another feeding conveyor 8 provided with a longitudinal partition 9 adapted to guide fruit carried by the conveyor into the chutes 10 and 11. The feeding conveyor 8 moves the fruit in the same general direction as the conveyor 4, and may be mounted on pulleys or driving cylinders 12 and 13.

A third conveyor 14 lies parallel to the conveyor 4 and extends from about the feeding end of conveyor 4 to the point at which the conveyor 8 starts. The conveyor 14, however, moves in a direction opposed to the direction of conveyor 4 and is adapted to discharge fruit into the drying, waxing and polishing units of the machine.

The citrus fruit delivered from the washer onto the sorting conveyor 4 are separated or sorted, this sorting being made with color as the major criterion. Culls, (oranges not fit for packing purposes) may be permitted to remain on the near side of the partition 5 and be moved by the conveyor 4 into the bin 15. Green fruit, or fruit which should be conditioned by sweating or by treatment with ethylene gas or other means of accelerating the development of natural color, may be placed beyond the transverse stationary partition 5 upon the feeding conveyor 4 so as to permit said conveyor to discharge said fruit into the bin 16 from whence such fruit may be sent to sweating rooms, ethylene treatment rooms, or the like. Fruit which are of perfectly developed color may be placed directly upon the return conveyor 14 as such fruit need not be subjected to a coloring treatment. The remaining fruit may then be sent through a uniform coloring step or it may be divided into two grades, namely, fruit which require a light coloring treatment and fruit which require a more energetic application of color. The very pale fruit, for example, may be placed on the furthest reach of the conveyor 8 beyond the partition 9 so as to cause such conveyor to discharge the fruit through the chute 10. Other fruit which require a lighter application of color may be placed on the conveyor 8 but on the near side of the partition 9 so as to cause such conveyor to discharge the fruit into the chute 11.

The coloring unit is generally indicated at 20 and may be provided with two separated troughs or tanks 21 and 22. Each of the tanks is provided with a continuous conveyor, such as is indicated at 23, the conveyor being provided with flights 24 which dip into the treating and coloring medium retained in such tanks. The flights of the conveyor 23 advance the fruit through the coloring medium at a desired rate. The fruit are then discharged into the deeper end 25 of the tank, from whence they are removed by an elevator 26. The speed at which the conveyor 23 is driven, regulates the time of contact between the coloring medium and the fruit. It will be remembered that the fruit discharged into the chute 10 are of a paler color than the fruit discharged into the trough 11, and for this reason the conveyor positioned in that tank which receives fruit from 11 may be driven at a higher rate of speed than the conveyor receiving the paler fruit through chute 10. Suitable heaters are provided in the coloring tanks 21 and 22 for the purpose of maintaining the coloring medium at a desired temperature.

The elevator discharges the now dyed fruit onto a series of driven brushes 27 which move the fruit in the direction of the arrow. While being scrubbed, the fruit are subjected to a rinsing spray of water from the spray head 28. The rinsing water may be caught in a tank 29 and recirculated. The fruit may then advance under a spray of water solution of green dye supplied by the spray heads 30. This application of green dye solution is for the purpose of coloring the stems and buttons of the fruit a natural green color or yellowish green color. The green dye solution may be caught in the pan 31 and also recirculated. The fruit then pass onto the upper reach of a return conveyor 32 which moves the fruit toward a skid or incline 33. This incline discharges the now suitably colored fruit upon the return conveyor 14.

From the conveyor 14 the fruit pass over the customary water-eliminating, drying, waxing and polishing units. The water-eliminating means are indicated at 34. The driers are indicated at 35 and the wax and polishing means are indicated at 36. The fruit discharged from the waxing and polishing means are then ready for final grading or sizing, boxing or packaging for shipment.

It will be noticed that the above arrangement of apparatus is readily adapted to the present arrangement of washing, drying, waxing, and polishing units in use in the packing houses. The sorting and coloring units are introduced into the present system without disrupting or rearranging the entire plant. Space is conserved and the operation of the process is carried out most effectively. The color imparted to the fruit in the manner above described is stable, does not rub off, and permits the growers to utilize to greatest advantage fruit of satisfactory juice and sugar content.

Those skilled in the art will appreciate that numerous changes, modifications, uses and adaptations of the inventions disclosed hereinabove may be made in addition to the illustrative proportions, conditions and uses specifically described. All such changes and modifications as come within the scope of the appended claims are embraced thereby.

I claim:

1. In a process of treating whole fruit provided with water repellent surfaces, the steps of contacting the fruit with an aqueous medium containing an oil soluble and substantially water-insoluble dye in colloidal suspension, said dye being of a color adapted to enhance the varietal color of the fruit being treated, and a surface tension reducing agent, for a time sufficient to impregnate the skin of the fruit with the said dye and impart a varietal coloration thereto, and subsequently contacting the fruit with a liquid containing a dye of substantially the color of the stem of the fruit for a period of time sufficient to impart a desired coloration to the stem of the fruit but not sufficient to impregnate the outer skin of the fruit with the said dye.

2. In a process of treating whole citrus fruit, the steps of separating fruit which it is desired to color from the remaining fruit, subjecting the separated fruit to the action of an aqueous medium containing a suitable oil soluble and substantially water-insoluble dye in colloidal suspension, and a surface tension reducing agent, said dye being of a color adapted to enhance the varietal color of the fruit being treated, for a time sufficient to impregnate the skin of the fruit with the said dye, rinsing the fruit to remove residual dye containing medium therefrom, and then contacting the fruit with a liquid containing a green dye for a length of time sufficient to impregnate the stem portion of the fruit with the green dye but insufficient to impregnate the outer skin of the fruit with the said dye.

3. In a process of treating whole citrus fruit, the steps of cleansing the fruit to remove foreign matter, separating washed fruit which it is desired to color from the remaining fruit, subjecting the separated fruit to the action of an aqueous medium containing a suitable oil-soluble and substantially water-insoluble dye for a length of time sufficient to impart an enhanced varietal color to the fruit, rinsing the fruit to remove residual aqueous medium therefrom, and then contacting the fruit with a liquid containing a green dye for a length of time sufficient to impregnate the stem portion of the fruit but insufficient to impregnate the remaining outer skin of the fruit.

4. The process of enhancing the varietal color of whole citrus fruit which comprises contacting the fruit with an aqueous medium containing a finely divided solid oil-soluble, water-insoluble dye in relatively stable suspension therein, the aqueous medium also containing a soap but being free from waxy solvents.

5. The method of improving the natural coloration of the skin of citrus fruit which comprises, applying to the fruit a dye composition consisting substantially of water, an oil-soluble, water-insoluble dye, and an aquasolufacient, whereby to deposit said dye within and upon the skin of the fruit.

6. The method of improving the natural coloring of the skin of citrus fruit which comprises, applying to the fruit a coloring composition including water, an oil-soluble, water-insoluble dye, and a material dissolved in the water which, together with the water, forms a liquid in the nature of a solvent for the dye, whereby to deposit the dye on the skin of the fruit.

7. The process of enhancing the varietal color of whole citrus fruit, which comprises contacting the fruit with an aqueous medium containing a finely divided solid oil-soluble, water-insoluble dye in relatively stable suspension therein, the aqueous medium also containing a surface tension reducing agent but being free from waxy solvents.

8. The process of enhancing the varietal color of whole citrus fruit, which comprises contacting the fruit with an aqueous medium containing finely divided dye particles of an oil-soluble, water-insoluble dye in relatively stable suspension therein, the aqueous medium also containing a surface tension reducing agent but being free from waxy solvents.

JAGAN N. SHARMA.